United States Patent
Monteiro Soares et al.

(10) Patent No.: US 11,399,059 B2
(45) Date of Patent: Jul. 26, 2022

(54) SYSTEM AND METHOD FOR DISTRIBUTED INDEXING IN PEER-TO-PEER NETWORKS

(71) Applicant: Telefonaktiebolaget LM Ericsson (publ), Stockholm (SE)

(72) Inventors: Joao Monteiro Soares, Solna (SE); Fetahi Wuhib, Sundbyberg (SE)

(73) Assignee: Telefonaktiebolaget LM Ericsson (Publ), Stockolm (SE)

( * ) Notice: Subject to any disclaimer, the term of this patent is extended or adjusted under 35 U.S.C. 154(b) by 0 days.

(21) Appl. No.: 17/258,915

(22) PCT Filed: Jul. 11, 2018

(86) PCT No.: PCT/IB2018/055128
§ 371 (c)(1),
(2) Date: Jan. 8, 2021

(87) PCT Pub. No.: WO2020/012223
PCT Pub. Date: Jan. 16, 2020

(65) Prior Publication Data
US 2021/0297482 A1    Sep. 23, 2021

(51) Int. Cl.
*H04L 67/104* (2022.01)
*H04L 67/1042* (2022.01)

(52) U.S. Cl.
CPC ........ *H04L 67/1042* (2013.01); *H04L 67/104* (2013.01)

(58) Field of Classification Search
CPC ........... H04L 67/1042; H04L 29/08306; H04L 45/02; G06F 16/1837; G06F 2221/07; G06Q 20/223; G05B 2219/1137
See application file for complete search history.

(56) References Cited

U.S. PATENT DOCUMENTS 7,478,120 B1    1/2009  Zhang
8,289,968 B1 *  10/2012 Zhuang ............... H04L 61/2532
                                                370/392
(Continued)

FOREIGN PATENT DOCUMENTS

EP    2497250 B1 *  3/2009  ............. H04L 29/08
WO    2011054375 A1    5/2011

OTHER PUBLICATIONS

International Search Report and Written Opinion dated Mar. 14, 2019 for International Application No. PCT/IB2018/055128 filed on Jul. 11, 2018, consisting of 10-pages.
(Continued)

*Primary Examiner* — Aftab N. Khan
(74) *Attorney, Agent, or Firm* — Christopher & Weisberg, P.A.

(57) ABSTRACT

A system and method for creating and updating a distributed indexing table for peer nodes in a peer-to-peer network. In one embodiment, a method includes providing, from a first node to a second node of the peer-to-peer network, a first level of a first plurality of levels for a first designator identifying the first node and entered in a first distributed indexing table stored in the first node. The method also includes receiving, at the first node from the second node, a corresponding first level of a second plurality of levels for a second designator identifying the second node and entered in a second distributed indexing table stored in the second node, and updating the corresponding first level of the second plurality of levels for the second designator within the first distributed indexing table of the first node.

17 Claims, 7 Drawing Sheets

(56) References Cited

U.S. PATENT DOCUMENTS

| | | | |
|---|---|---|---|
| 2004/0044727 A1* | 3/2004 | Abdelaziz | H04L 67/107 709/203 |
| 2004/0064512 A1* | 4/2004 | Arora | H04L 63/0428 709/206 |
| 2004/0122903 A1* | 6/2004 | Saulpaugh | H04L 29/12594 709/206 |
| 2004/0210624 A1* | 10/2004 | Andrzejak | H04L 67/1074 709/201 |
| 2006/0041560 A1* | 2/2006 | Forman | G06F 16/951 |
| 2007/0112803 A1* | 5/2007 | Pettovello | G06F 16/134 |
| 2008/0183853 A1* | 7/2008 | Manion | H04L 67/1093 709/223 |
| 2011/0282883 A1* | 11/2011 | Liu | G06F 16/1837 707/741 |
| 2012/0221647 A1* | 8/2012 | Ciminiera | H04L 67/104 709/204 |
| 2013/0275476 A1* | 10/2013 | Chandler | G06F 16/24552 707/825 |
| 2014/0095605 A1* | 4/2014 | Varvello | H04L 67/22 709/204 |
| 2014/0297742 A1* | 10/2014 | Lyren | H04L 67/1089 709/204 |

OTHER PUBLICATIONS

Yunhao Liu et al.; Location-Aware Topology Matching in P2P Systems; Conference Paper in Proceedings; ResearchGate; Jan. 2004, consisting of 12-pages.

Russ Cox et al.; Serving DNS using a Peer-to-Peer lookup Service; MIT Laboratory for Computer Science; consisting of 11-pages.

Ion Stoica et al.; Chord: A Scalable Peer-to-Peer Lookup Protocol for Internet Applications; Defense Advanced Research Projects Agency, consisting of 14-pages.

* cited by examiner

SYSTEM AND METHOD FOR DISTRIBUTED INDEXING IN PEER-TO-PEER NETWORKS

CROSS-REFERENCE TO RELATED APPLICATIONS

This application is a Submission Under 35 U.S.C. § 371 for U.S. National Stage Patent Application of International Application Number: PCT/IB2018/055128, filed Jul. 11, 2018 entitled "SYSTEM AND METHOD FOR DISTRIBUTED INDEXING IN PEER-TO-PEER NETWORKS," the entirety of which is incorporated herein by reference.

TECHNICAL FIELD

The disclosure relates, in general, to communication systems and, more particularly, to a system and method for creating and updating a distributed indexing table for peer nodes in a peer-to-peer network.

BACKGROUND

The need for computing capacity spread across networks continues to increase, generally for cloud type computing capacity. Regular computing capacity for normal network switching and routing is generally less affected. Distributed cloud and edge computing are terms that can be associated with this trend, where computing capacity is located in places such as telephone company points of presence, central offices, radio base stations, etc. If this trend is taken to a global perspective (e.g., country, continental, worldwide), one can be talking about thousands, hundreds of thousands of locations, or even more. Moreover, in such scenarios workload deployment and adjustments can be quite dynamic.

What makes distributed cloud and edge computing special is the ability to deploy a service close to where it is needed, reducing latency and traffic that crosses the backbone of a network by keeping local traffic local. However, to be able to deploy workloads in the above way, there should be a mechanism capable of locating service points close to an end user.

In this reality, due to scalability issues, it is generally ineffective to rely on a centralized management type of approach. Distributed approaches, such as peer-to-peer approaches, are more efficient to enable this service. Accordingly, what is needed in the art is a system and method to facilitate distributed indexing of peer nodes in a peer-to-peer network.

SUMMARY

These and other problems may be generally solved or circumvented, and technical advantages may be generally achieved, by advantageous embodiments of the present disclosure, including a system and method for creating and updating a distributed indexing table for peer nodes in a peer-to-peer network. In one embodiment, a method operable in the peer-to-peer network includes providing, from a first node to a second node of the peer-to-peer network, a first level of a first plurality of levels for a first designator identifying the first node and entered in a first distributed indexing table stored in the first node. The method also includes receiving, at the first node from the second node, a corresponding first level of a second plurality of levels for a second designator identifying the second node and entered in a second distributed indexing table stored in the second node, and updating the corresponding first level of the second plurality of levels for the second designator within the first distributed indexing table of the first node.

While the aforementioned method is performed from the perspective of a peer node, the analogous apparatus includes a first node operable in a peer-to-peer network including processing circuitry configured to provide to a second node of the peer-to-peer network a first level of a first plurality of levels for a first designator identifying the first node and entered in a first distributed indexing table stored in the first node. The first node is also configured to receive from the second node a corresponding first level of a second plurality of levels for a second designator identifying the second node and entered in a second distributed indexing table stored in the second node, and update the corresponding first level of the second plurality of levels for the second designator within the first distributed indexing table of the first node.

The foregoing has outlined rather broadly the features and technical advantages of the present examples in order that the detailed description that follows may be better understood. Additional features and advantages of various examples will be described hereinafter, which form the subject of the claims of the invention. It should be appreciated by those skilled in the art that the conception and specific embodiments disclosed may be readily utilized as a basis for modifying or designing other structures or processes for carrying out the same purposes of different embodiments. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for operating peer nodes in a peer-to-peer network. While the principles will be described in the environment of a peer-to-peer network, any communication system is well within the broad scope of the present disclosure.

Peer-to-peer approaches have existed for a while, and have been mostly explored and applied in networking scenarios due to their scale. Examples and descriptions of current peer-to-peer approaches are described in a paper by Cox, et al., entitled "Serving DNS Using a Peer-to Peer Lookup Service," International Workshop on Peer-to-Peer Systems, 2002, in a paper by Liu, et al., entitled "Location-Aware Topology Matching in P2P Systems," International Conference on Computer Systems, 2004, in a paper by Stoica, et al., entitled "Chord: A Scalable Peer-to-Peer Lookup Service for Internet Applications," ACM Special Interest Group on Data Communication, 2001, in U.S. Patent Application Publication No. 2012/0158756 by Jimenez, entitled "Searching in Peer to Peer Networks," in U.S. Patent Application Publication No. 2007/0112803 by Pettovilo entitled "Peer-to-Peer Semantic Indexing," in U.S. Patent Application Publication No. 2008/0195597 by Rosenfeld, et al., entitled "Searching in Peer-to-Peer Networks," in U.S. Pat. No. 7,206,934 by Pabla, et al., entitled "Distributed Indexing of Identity Information in a Peer-to-Peer Network," and in U.S. Pat. No. 7,478,120 by Zhang, entitled "System and Method for Providing a Peer Indexing Service," all of which are incorporated herein by reference.

Current location-based solutions typically rely on using hash functions to map identities ("IDs") of peer nodes into an indexed search space. This makes exact matching search possible when the ID of the service point is specified. However, since the hashing process does not preserve location information, such approaches cannot be used to perform searches by specifying, for instance, the end-user location.

The solution introduced herein provides peer node interaction to update distributed indexing tables to facilitate network-based computing in a distributed configuration. The solution describes a method for building domain name system ("DNS")-like distributed indexing for peer-to-peer networks. Hierarchical network address labeling is provided, wherein each peer node in the network keeps a pointer to a peer node at all the levels of a network address space.

Each peer node in the network builds a distributed indexing table by looking at its own designator such as a network address label and by using a pointer to another peer node in the peer-to-peer network. After building its initial distributed indexing table, peer nodes exchange peer table information allowing new peer nodes in the network to be incorporated in its distributed indexing table and peer nodes that depart the network to be removed from the distributed indexing table. The solution allows building location-aware distributed indexing in a peer-to-peer network that is much simpler than existing solutions, while at the same time maintaining the robustness and scalability properties of peer-to-peer networks.

Figure 1:
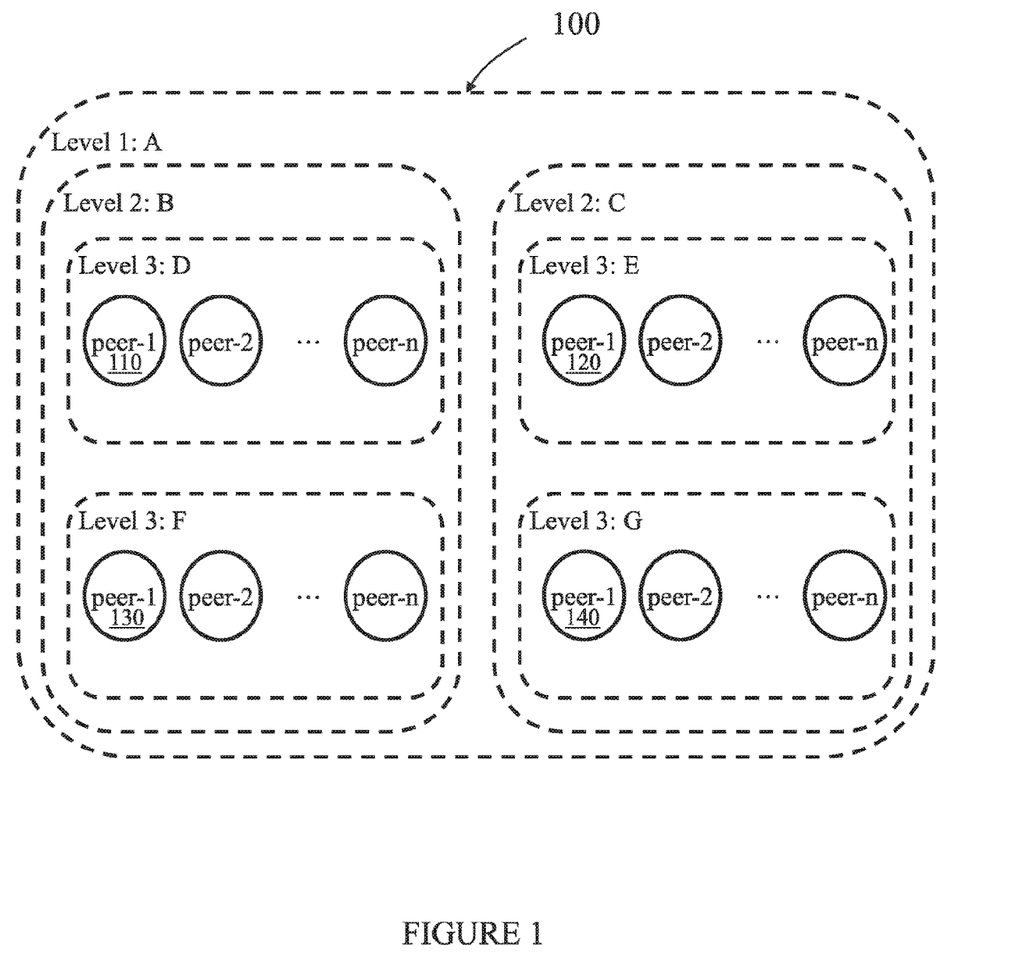
FIG. 1 illustrates a diagram of an embodiment of a peer-to-peer network.

Referring initially to FIG. 1, illustrated is a diagram of an embodiment of a peer-to-peer network 100. The peer-to-peer network 100 is organized in three levels, each level having "n" peer nodes in each of the lower third levels. The number of peer nodes in a level can vary form level-to-level. The top level is identified as level "A", and the two second levels are identified as levels "B" and "C". The lowest levels are identified as levels "D", "E", "F", and "G". The peer nodes can be associated with a data center, a radio base station, user equipment, a machine-to-machine device, etc.

As an example, the top level "A" may represent a respective continent such as North America. The second level ("B" or "C") may represent a country such as Canada or the United States. The third level ("D", "E", "F", or "G") may represent a city, such as Montréal, Vancouver, Denver, or New York City. The peer nodes (designated peer-1, peer-2, . . . , peer-n) are illustrated in the lowest levels. For purposes of illustration, a peer node-1 is designated 110, 120, 130, 140 in level 3 "D", "E", "F", and "G", respectively.

The peer nodes are thus organized in different levels and may communicate/exchange data with each other. At the lowest level, the peer nodes are generally located within a common geographical area such as a city or a portion of a city. At a higher level, for example, the peer nodes are located within a common country, such as Canada, or perhaps in a state or a territory. A peer node can be identified with a designator such as a fully-qualified domain name (e.g., "peer-1.D.B.A" for peer-1 designated 110 and "peer-1.G.C.A" for peer-1 designated 140). Thus, the general physical location of a peer node can be identified by its designator such as a fully-qualified domain name. Of course, other parameters as opposed to or in addition to location can be identified in accordance with the designator.

Figure 2:
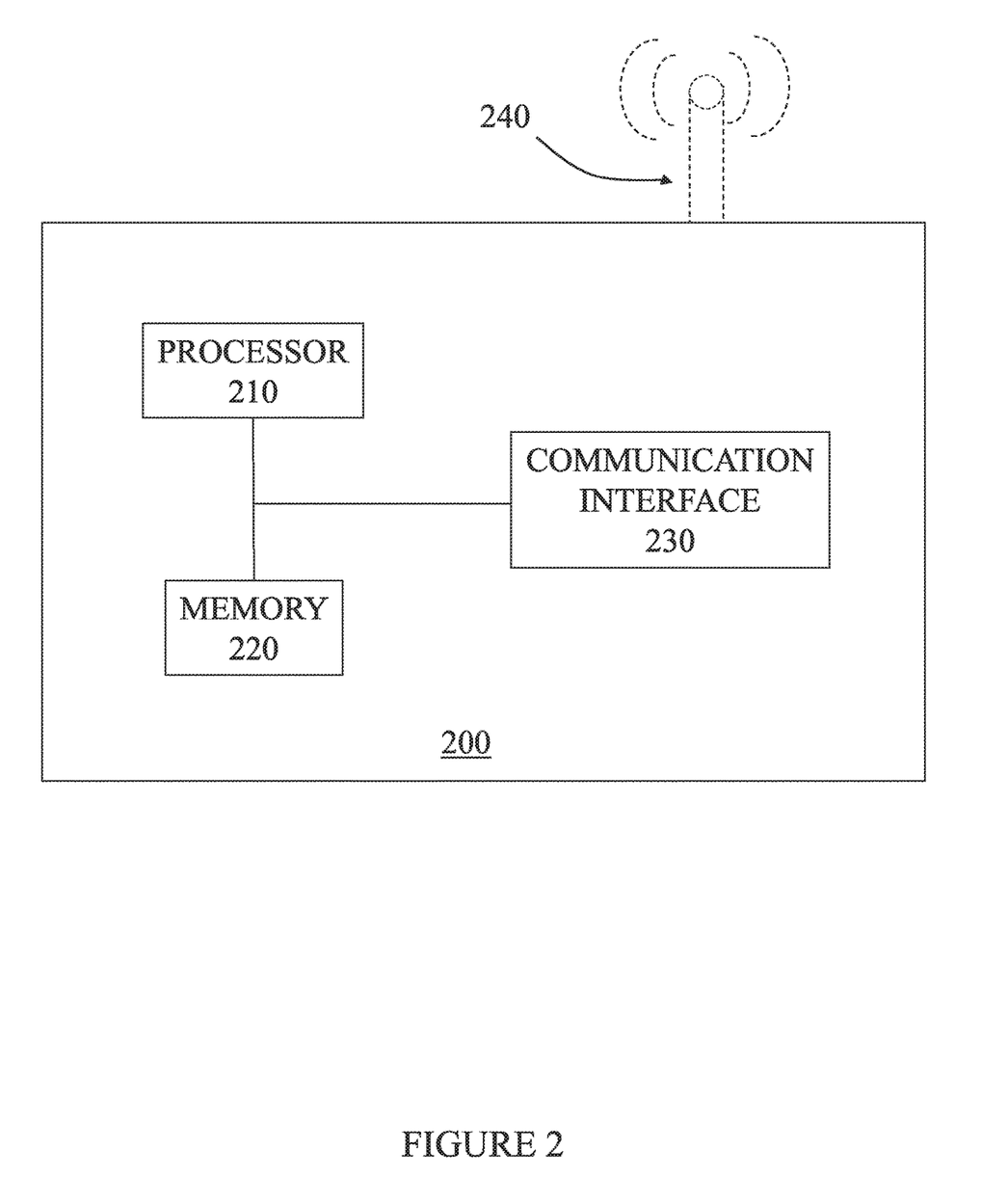
FIG. 2 illustrates a block diagram of an embodiment of a peer node.

Turning now to FIG. 2, illustrated is a block diagram of an embodiment of a peer node 200. The peer node 200 includes a processor (or processing circuitry) 210, a memory 220 and a communication interface 230. The peer node 200 may also include an antenna(s) 240 depending on the type of device such as a user equipment. In particular embodiments, some or all of the functionality described herein may be provided by, without limitation, a user equipment, machine type communication ("MTC") and machine-to-machine ("M2M") devices, a radio base station, a radio network controller, a relay station, and a data center (e.g., computer(s) that form a data center).

The functionality of the peer node 200 may be provided by the processor 210 executing instructions stored on a computer-readable medium, such as the memory 220 shown in FIG. 2. Alternative embodiments of the peer node 200 may include additional components (such as the interfaces, devices and circuits mentioned above) beyond those shown in FIG. 2 that may be responsible for providing certain aspects of the device's functionality, including any of the functionality to support the solution described herein.

The processor 210 (or processors), which may be implemented with one or a plurality of processing devices, perform functions associated with its operation including, without limitation, precoding of antenna gain/phase parameters, encoding and decoding of individual bits forming a communication message, formatting of information and overall control of a respective peer node 200. Exemplary functions related to management of communication resources include, without limitation, hardware installation, traffic management, performance data analysis, configuration management, security, billing and the like. The processor 210 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The processor 210 may include one or more of radio frequency ("RF") transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset.

The processor 210 may be configured to perform any operations described herein. The operations as performed by the processor 210 may include processing information obtained by the processor by, for example, converting the obtained information into other information, comparing the obtained information or converted information to information stored in the respective device, and/or performing one or more operations based on the obtained information or converted information, and, as a result of the processing, making a determination.

The memory 220 (or memories) may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memory 220 may include program instructions or computer program code that, when executed by an associated processor, enable the respective peer node 200 to perform its intended tasks. Of course, the memory 220 may form a data buffer for data transmitted to and from the same. Exemplary embodiments of the system, subsystems, and modules as described herein may be implemented, at least in part, by computer software executable by the processor 210, or by hardware, or by combinations thereof.

The communication interface 230 modulates information onto a carrier waveform for transmission by the respective peer node 200 to another peer node. The respective communication interface 230 also demodulates information received from another peer node for further processing. The communication interface 230 can support duplex operation for the respective peer node 200, and supports communication with a core network.

The antenna 240 (antennas), when applicable, may be any type of antenna capable of transmitting and receiving data and/or signals wirelessly. In some embodiments, the antenna 240 may include one or more omni-directional, sector or panel antennas operable to transmit/receive radio signals between, for example, 2 gigahertz ("GHz") and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. While the antenna 240 facilitates wireless communication for the peer node 200, the peer node 200 may also communicate via a wired communication path via the communication interface 230 and, in such instances, the antenna 240 may not be necessary.

A distributed system of peer nodes is assumed wherein each peer node is assigned a designator such as, without limitation, a unique, dot-separated label to represent its identity. Another character-separated label scheme other than a dot-separated label can be employed within the broad scope of the present disclosure. Labels are assigned according to what the indexes are used to search for. To help describe the method, a particular example is used in which labels are chosen following the geographical location of the nodes such as <continent>.<country>.<state>.<city>.<local id>. For instance, a $5^{th}$ peer node in Lund, Sweden will have the label eu.se.skane.lund.node-5.

The peer nodes may have a limited memory to store nodes' labels and associated network addresses of several other peer nodes. This information is called the 'state' of a peer node. It is also assumed that a peer node is capable of exchanging parts of its state with another peer node it chooses. The term 'level' is used to describe which part of the label is being handled. For the above example, the country-level identifier is 'se', identifying Sweden.

Figure 3:
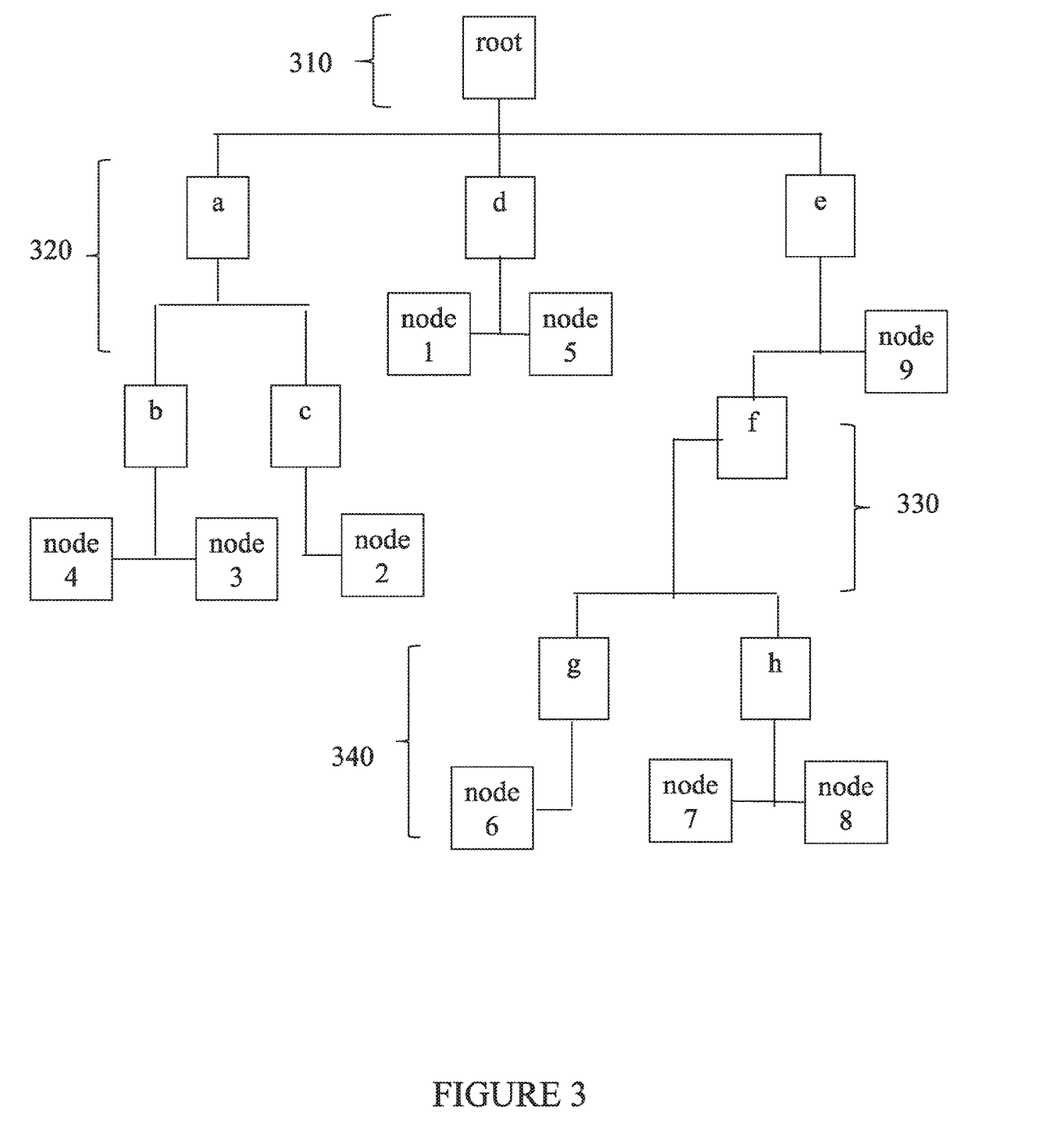
FIG. 3 illustrates a block diagram of an embodiment of labeling peer nodes.

Turning now to FIG. 3, illustrated is a block diagram of an embodiment of labeling peer nodes. The state of a peer node is organized into rows. A root level 310 is illustrated at the top level representing a continent. There are rows to all but the last level for a node's label. Under the root level 310 is a country level 320 (with designators a, d, e) where information about each country in that continent is stored. Within the country designator "d" resides node 1 and node 5, and within the country designator "e" resides node 9. Under the country level 320 is a state level 330 (with designators b, c, f) where information about each state in that country is stored. Within the state designator "b" resides node 3 and node 4, and within the state designator "c" resides node 2. Under the state level 330 is a city level 340 (with designators g, h) where information about each city in that state is stored. Within the city designator "g" (from state designator "f") resides node 6, and within the city designator "h" (from state designator "f") resides node 7 and node 8.

Thus, in each list at each level, information is included about a few nodes that belong to that specific label at that level. For instance, one list in the continent level for label 'eu.se' will keep information of a few random peer nodes in Sweden. The information about a peer node includes the last time its information was updated and other necessary information.

Peer-to-peer ("P2P") node indexing employs a component that creates and maintains the distributed indexing across the distributed peer nodes. An example method is described as set forth below. When the method starts, a peer node assumes that it knows of an introducer node. An introducer node can be an infrastructure node that exists, or it could also be a random peer node already in the peer-to-peer network. The method has a few configurable parameters such as "k" (the maximum number of peer nodes for each label at a level), "l" (the maximum number of peer nodes for each label selected for exchange) and "r" (the length of each round). For purposes of understanding, a distributed indexing table includes different levels and each level may contain different labels that pertain to different locations or other characteristics of that level. For instance, a label for Sweden within Europe may be "eu.se" whereas a label for Finland may be "eu.fi". The designators resident in a distributed indexing table for a peer node are typically limited to labels consistent with its geographical area or other characteristic pertinent to that peer node, otherwise the size of the table could be unmanageable.

Figure 4:
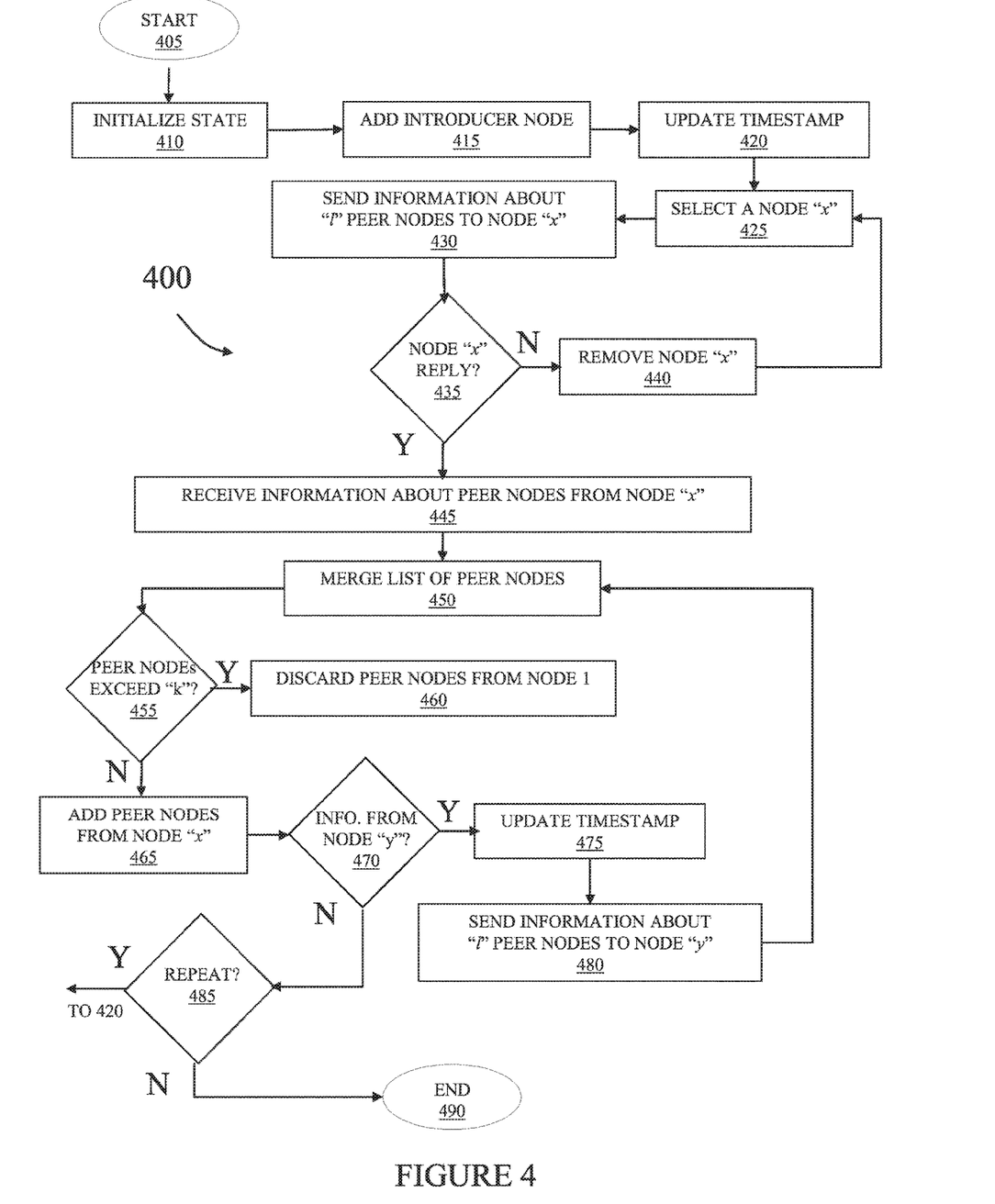
FIG. 4 illustrates a flow diagram of an embodiment of a method of operating a peer-to-peer network.

Referring now to FIG. 4, illustrated is flow chart of an embodiment of a method 400 of operating a peer-to-peer network. The method 400 will described from the perspective of a peer node referred to as node 1. The method 400 begins at a start step or module 405 and then transitions to a step or module 410 with node 1 initializing its state with information for each row of a distributing indexing table of node 1. At step or module 415, node 1 adds an introducer node with a current timestamp to a row with an appropriate label of the distributed indexing table. The following steps are performed for each row or level of the distributed indexing table, starting from the top and ending at the bottom, until the method 400 concludes.

At a step or module 420, node 1 updates its timestamp with the current time. Node 1 then selects another node (e.g., a node x) with the oldest timestamp at a step or module 425. At a step or module 430, node 1 sends information about l peer nodes for each unique label to node x, ensuring that the random choice includes its label and excludes node x at the appropriate labels. At a decisional step or module 435, the method 400 determines if node x replies. If node x does not reply, at a step or module 440, node x is removed from the distributed indexing table of node 1 and the method 400 returns to the step or module 425.

If node x replies, node 1 receives information about peer nodes for each label from node x at a step or module 445. For each label, node 1 merges a list of peer nodes from node x with the peer nodes from node 1, keeping the latest information in the distributed indexing table whenever available at a step or module 450. At a decisional step or module 455, the method 400 determines if the merged list of peer nodes from node "x" and node 1 exceeds a parameter "k". If for each label, the number of peer nodes in the list exceeds the parameter k, node 1 discards the peer nodes from node 1, but otherwise keeps the peer nodes received from node x in the distributed indexing table of node 1 at a step or module 460. If for each label, the number of peer nodes in the list is below the parameter k, node 1 adds the additional peer nodes (from node "x") to the distributed indexing table with the appropriate label and row at a step or module 465.

At a decisional step or module 470, the method 400 determines if node 1 will receive information from another node (e.g., node "y"). If node 1 receives state information for a specific row from node y, node 1 updates its timestamp in this row to the current time at a step or module 475. At a step or module 480, node 1 sends information about l peer nodes for each unique label to node y, ensuring that the random choice includes its label and excludes node y at the appropriate labels and then the method 400 continues with the step or module 450.

If node 1 does not receive state information for a specific row from node y, it is determined if the method 400 should repeat at a decisional step or module 485. If the method 400 repeats, for instance, at another row or level of the distributed indexing table, the method returns to the step or module 420, otherwise the method 400 concludes at an end step or module 490.

Consider an example where a distributed cloud is deployed in the Nordic regions spanning Sweden (se), Norway (no), Denmark (dk) and Finland (fi). In Sweden, let there be four states with data centers in Stockholm, Norrbotten, Jamtland and Skane. In Skane, there are two cities with data centers Lund and Malmo, each of which has two data centers. In this setting, k=2 and r=1, and the node eu.se.skane.lund.node-5 (also referred to as "node 5") is starting up.

Step or module 410: Initialize state of the distributed indexing table for node 5 including information for each row of the distributed indexing table (see Table 11

TABLE 1

| level | neighbors |
|---|---|
| eu | eu.se: (eu.se.skane.lund.node-5: 1) |
| se | eu.se.skane: (eu.se.skane.lund.node-5: 1) |

TABLE 1-continued

| level | neighbors |
|---|---|
| skane | eu.se.skane.lund: (eu.se.skane.lund.node-5: 1), |
| lund | eu.se.skane.lund.node-5: (eu.se.skane.kind.node-5: 1) |

Step or module 415: Add the introducer node with the current timestamp to the first row of the distributed indexing table at the appropriate label (see Table 2).

Introducer node—eu.se.jmtlnd.ostersnd.node-2.

TABLE 2

| level | neighbors |
|---|---|
| eu | eu.se: (eu.se.skane.lund.node-5: 1, eu.se.jmtlnd.ostersnd.node-2, 5) |
| se | eu.se.skane: (eu.se.skane.lund.node-5: 1) |
| skane | eu.se.skane.lund: (eu.se.skane.lund.node-5: 1), |
| lund | eu.se.skane.lund.node-5: (eu.se.skane.lund.node-5: 1) |

The example continues for each row of the distributed indexing table, starting from the top and ending at the bottom.

Row: "eu"

Step or module 420: Update the distributed indexing table for node 5 including timestamp with current time (see Table 3).

TABLE 3

| level | neighbors |
|---|---|
| eu | eu.se: (eu.se.skane.lund.node-5: 6, eu.se.jmtlnd.ostersnd.node-2, 5) |

Step or module 425: Choose node x with the oldest timestamp.

eu.se.jmtlnd.ostersnd.node-2, 5

Step or module 430: Send information about l peer nodes for each unique label to node x, ensuring that the random choice includes the information for node 5 and excludes the information for node x at the appropriate labels (see Table 4).

TABLE 4

| eu | eu.se: (eu.se.skane.lund.node-5: 6) |
|---|---|

Step or module 440: If node x does not reply, remove node x from the distributed indexing table and return to the step or module 425.

Step or module 445: Receive information about peer nodes for each label from node x (see Table 5).

TABLE 5

| eu | eu.se: (eu.se.jmtlnd.ostersnd.node-2), |
|---|---|
| | eu.fi: (eu.fi.helsinki.jorvas.node-2, eu.fi.helsinki.jorvas.node-3), |
| | eu.no: (eu.no.oslo.oslo.node-1, eu.no.rogaland.stavanger.node-2), |
| | eu.dk: (eu.dk.nordjylland.aalborg.node-2) |

Step or module 450: For each label, merge the list about peer nodes from node x (with the peer nodes from node 5), keeping the latest information in the distributed indexing table whenever available (see Table 6).

TABLE 6

| level | neighbors |
|---|---|
| eu | eu.se: (eu.se.skane.lund.node-5: 6, eu.se.jmtlnd.ostersnd.node-2: 10), eu.fi: (eu.fi.helsinki.jorvas.node-2: 10, eu.fi.helsinki.jorvas.node-3: 10), eu.no: (eu.no.oslo.oslo.node-1: 10, eu.no.rogaland.stavanger.node-2: 10), eu.dk: (eu.dk.nordjylland.aalborg.node-2: 10) |
| se | eu.se.skane: (eu.se.skane.lund.node-5: 1) |
| skane | eu.se.skane.lund: (eu.se.skane.lund.node-5: 1), |
| lund | eu.se.skane.lund.node-5: (eu.se.skane.lund.node-5: 1) |

Step or module 460: If for each label, the number of peer nodes in the list exceeds the parameter k, node 5 discards the peer nodes from node 5, but otherwise keeps the peer nodes received from node x in the distributed indexing table of node 5.

Step or module 465: If for each label, the number of peer nodes in the list is below the parameter k, node 5 adds the additional peer nodes (from node "x") to the distributed indexing table with the appropriate label and row (see Table 7).

TABLE 7

| level | neighbors |
|---|---|
| eu | eu.se: (eu.se.skane.lund.node-5: 6, eu.se.jmtlnd.ostersnd.node-2: 10), eu.fi: (eu.fi.helsinki.jorvas.node-2: 10, eu.fi.helsinki.jorvas.node-3: 10), eu.no: (eu.no.oslo.oslo.node-1: 10, eu.no.rogaland.stavanger.node-2: 10), eu.dk: (eu.dk.nordjylland.aalborg.node-2: 10) |
| se | eu.se.skane: (eu.se.skane.lund.node-5: 1), eu.se.jmtlnd.ostersnd.node-2: 10) |
| skane | eu.se.skane.lund: (eu.se.skane.lund.node-5: 1), |
| lund | eu.se.skane.lund.node-5: (eu.se.skane.lund.node-5: 1) |

Repeat the method for each row, starting from the top and ending at the bottom.

Row: "se"

Continue in a similar way as set forth above row "eu".

In another example, the initial bootstrap/startup of the node is not depicted. A later period in time is set forth below, where the nodes have been running for a while. Consider the same example as before, where a distributed cloud is deployed in the Nordic regions spanning Sweden (se), Norway (no), Denmark (dk) and Finland (fi). In Sweden, let there be four states with data centers including Stockholm, Norrbotten, Jamtland and Skane. In Skane, there are two cities with data centers including Lund and Malmo, each of which have two data centers. In this setting, if k=2 and r=1, the state of a node eu.se.skane.lund.node-5 (also referred to as "node 5") may look like (see Table 8):

TABLE 8

| level | neighbors |
|---|---|
| eu | eu.se: (eu.se.skane.lund.node-5: 100, eu.se.jmtlnd.ostersnd.node-2: 92), eu.fi: (eu.fi.helsinki.jorvas.node-2: 85, eu.fi.helsinki.jorvas.node-3: 83), eu.no: (eu.no.oslo.oslo.node-1: 92, eu.no.rogaland.stavanger.node-2: 97), eu.dk: (eu.dk.nordjylland.aalborg.node-2: 95) |
| se | eu.se.skane: (eu.se.skane.lund.node-5: 100), eu.se.skane.malmo.node-2: 87), eu.se.stockhlm: (eu.se.stockhlm.kista.node-5: 89, eu.se.stockhlm.or.node-5: 80), |

TABLE 8-continued

| level | neighbors |
|---|---|
| | eu.se.norrbtn: (eu.se.norrbtn.lulea.node-5: 94, eu.se.norrbtn.kiruna.node-1: 94), eu.se.jmtlnd: (eu.se.jmtlnd.ostersnd.node-2: 92, eu.se.jmtlnd.stromsnd.node-2: 99) |
| skane | eu.se.skane.lund: (eu.se.skane.lund.node-5: 100, eu.se.skane.lund.node-4: 97), eu.se.skane.malmo: (eu.se.skane.malmo.node-1: 88) |
| lund | eu.se.skane.lund.node-5: (eu.se.skane.lund.node-5: 100), eu.se.skane.lund.node-4: (eu.se.skane.lund.node-4: 97) |

The following is an example of the above node executing a round for row 'eu', at a time 105.

State before (see Table 9):

TABLE 9

| eu | eu.se: (eu.se.skane.lund.node-5: 100, eu.se.jmtlnd.ostersnd.node-2: 92), eu.fi: (eu.fi.helsinki.jorvas.node-2: 85, eu.fi.helsinki.jorvas.node-3: 83), eu.no: (eu.no.oslo.oslo.node-1: 92, eu.no.rogaland.stavanger.node-2: 97), eu.dk: (eu.dk.nordjylland.aalborg.node-2: 95) |
|---|---|

Step or module 420: Update the distributed indexing table for node 5 including timestamp with current time (see Table 10).

TABLE 10

| eu | eu.se: (eu.se.skane.lund.node-5: 105, eu.se.jmtlnd.ostersnd.node-2: 92), eu.fi: (eu.fi.helsinki.jorvas.node-2: 85, eu.fi.helsinki.jorvas.node-3: 83), eu.no: (eu.no.oslo.oslo.node-1: 92, eu.no.rogaland.stavanger.node-2: 97), eu.dk: (eu.dk.nordjylland.aalborg.node-2: 95) |
|---|---|

Step or module 425: Choose node x with the oldest timestamp.

eu.fi.helsinki.jorvas.node-3

Step or module 430: Send information about 1 peer nodes for each unique label to node x, ensuring that the random choice includes the information for node 5 and excludes the information for node x at the appropriate labels (see Table 11).

TABLE 11

| eu | eu.se: (eu.se.skane.lund.node-5: 105), eu.fi: (eu.fi.helsinki.jorvas.node-2: 85), eu.no: (eu.no.oslo.oslo.node-1: 92), eu.dk: (eu.dk.nordjylland.aalborg.node-2: 95) |
|---|---|

Step or module 440: If node x does not reply, remove node x from the distributed indexing table and return to the step or module 425.

Step or module 445: Receive information about peer nodes for each label from node x (see Table 12).

TABLE 12

| eu | eu.se: (eu.se.jmtlnd.stromsnd.node-2: 100), eu.fi: (eu.fi.helsinki.jorvas.node-3: 105), eu.no: (eu.no.oslo.oslo.node-3: 97), eu.dk: (eu.dk.nordjylland.aalborg.node-2: 92) |
|---|---|

Step or module 450: For each label, merge the list about peer nodes from node x (with the peer nodes from node 5), keeping the latest information in the distributed indexing table whenever available (see Table 13).

TABLE 13

| eu | eu.se: (eu.se.skane.lund.node-5: 105, eu.se.jmtlnd.ostersnd.node-2: 92, eu.se.jmtlnd.stromsnd.node-2: 100), eu.fi: (eu.fi.helsinki.jorvas.node-2: 85, eu.fi.helsinki.jorvas.node-3: 105), eu.no: (eu.no.oslo.oslo.node-1: 92, eu.no.rogaland.stavanger.node-2: 97, eu.no.oslo.oslo.node-3: 97), eu.dk: (eu.dk.nordjylland.aalborg.node-2: 95) |
|---|---|

Step or module 460: If for each label, the number of peer nodes in the list exceeds the parameter k, node 5 discards the peer nodes from node 5 (illustrated as lined out entries), but otherwise keeps the peer nodes received from node x in the distributed indexing table of node 5 (see Table 14).

TABLE 14

| eu | eu.se: (eu.se.skane.lund.node-5: 105, ~~eu.se.jmtlnd.ostersnd.node-2: 92~~, eu.se.jmtlnd.stromsnd.node-2: 100), eu.fi: (eu.fi.helsinki.jorvas.node-2: 85, eu.fi.helsinki.jorvas.node-3: 105), eu.no: (~~eu.no.oslo.oslo.node-1: 92~~, eu.no.rogaland.stavanger.node-2: 97, eu.no.oslo.oslo.node-3: 97), eu.dk: (eu.dk.nordjylland.aalborg.node-2: 95) |
|---|---|

Step or module 465: If for each label, the number of peer nodes in the list is below the parameter k, node 5 adds the additional peer nodes (from node "x") to the distributed indexing table with the appropriate label and row. Update row 'eu.se': nodes eu.se.jmtlnd.stromsnd.node-2 would have been put to label eu.se.jmllnd at row eu.se if the list was not already at full capacity.

Thus, a method for building DNS-like distributed indexing for peer-to-peer networks has been introduced. Each peer node in the peer-to-peer network can build its distributed indexing table by looking at its own "network address label" and by being giving a pointer to an existing node in the peer-to-peer network. A hierarchical "network address labeling" is assumed, wherein each peer node in the peer-to-peer network keeps a pointer to a peer node at all the levels of its own network address space. After building its initial distributed indexing table, peer nodes exchange peer table information allowing new nodes in the peer-to-peer network to be incorporated in a node's distributed indexing table when that is the case and peer nodes that leave the peer-to-peer network to be excluded from the node's distributed indexing table.

Figure 5:
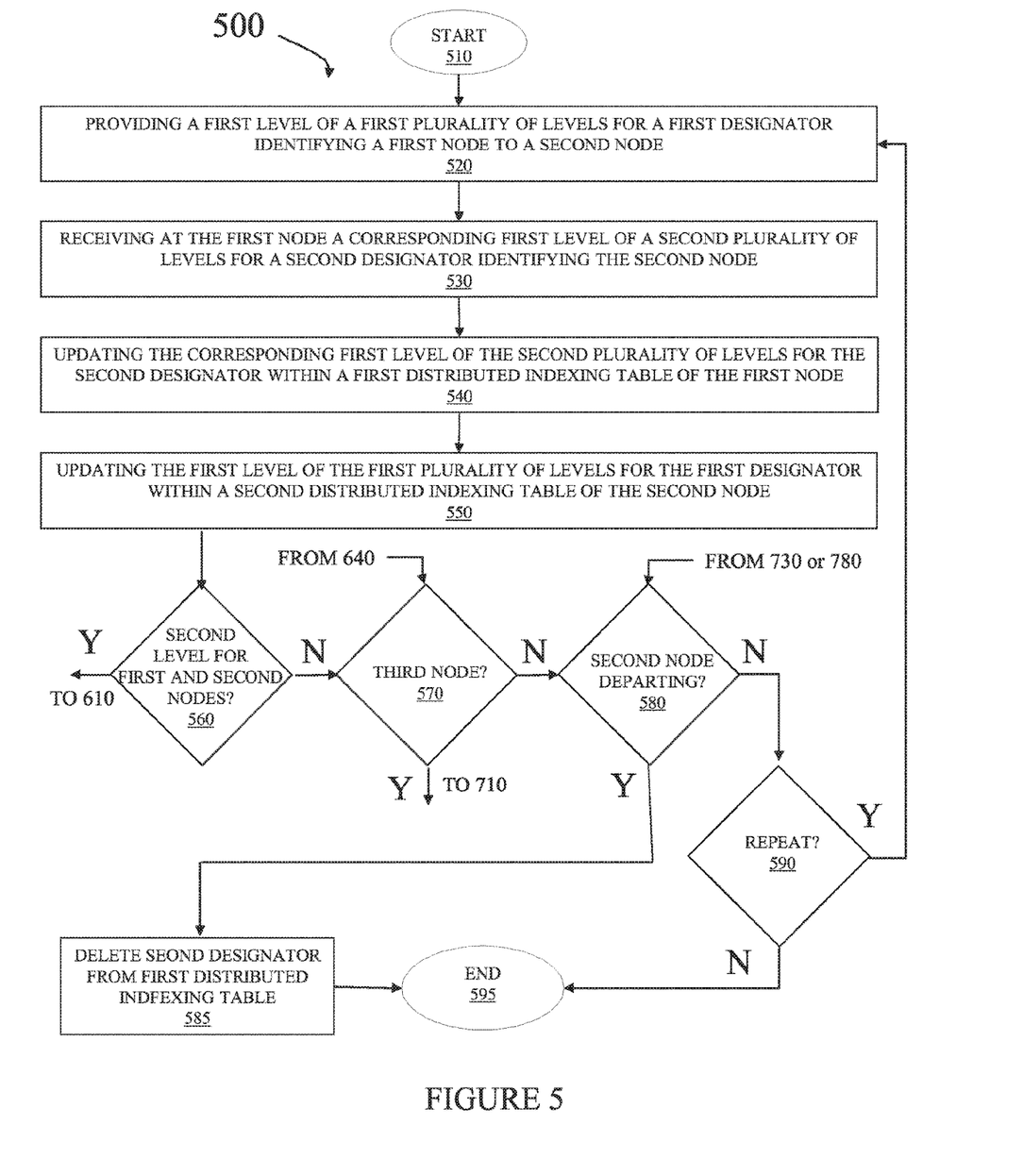
FIGS. 5 to 7 illustrate flow diagrams of an embodiment of a method of operating a peer-to-peer network.
Figure 6:
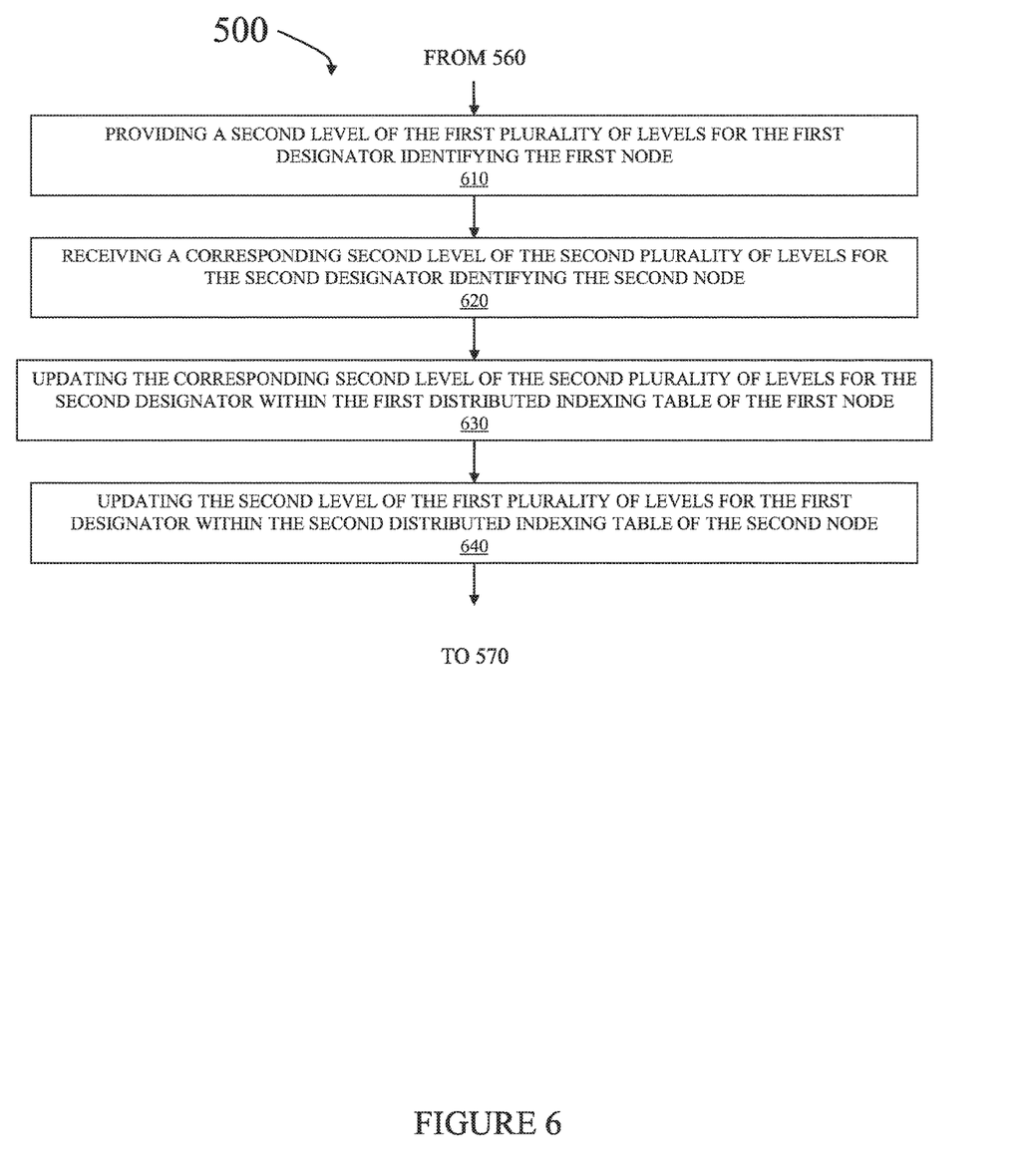
Figure 7:
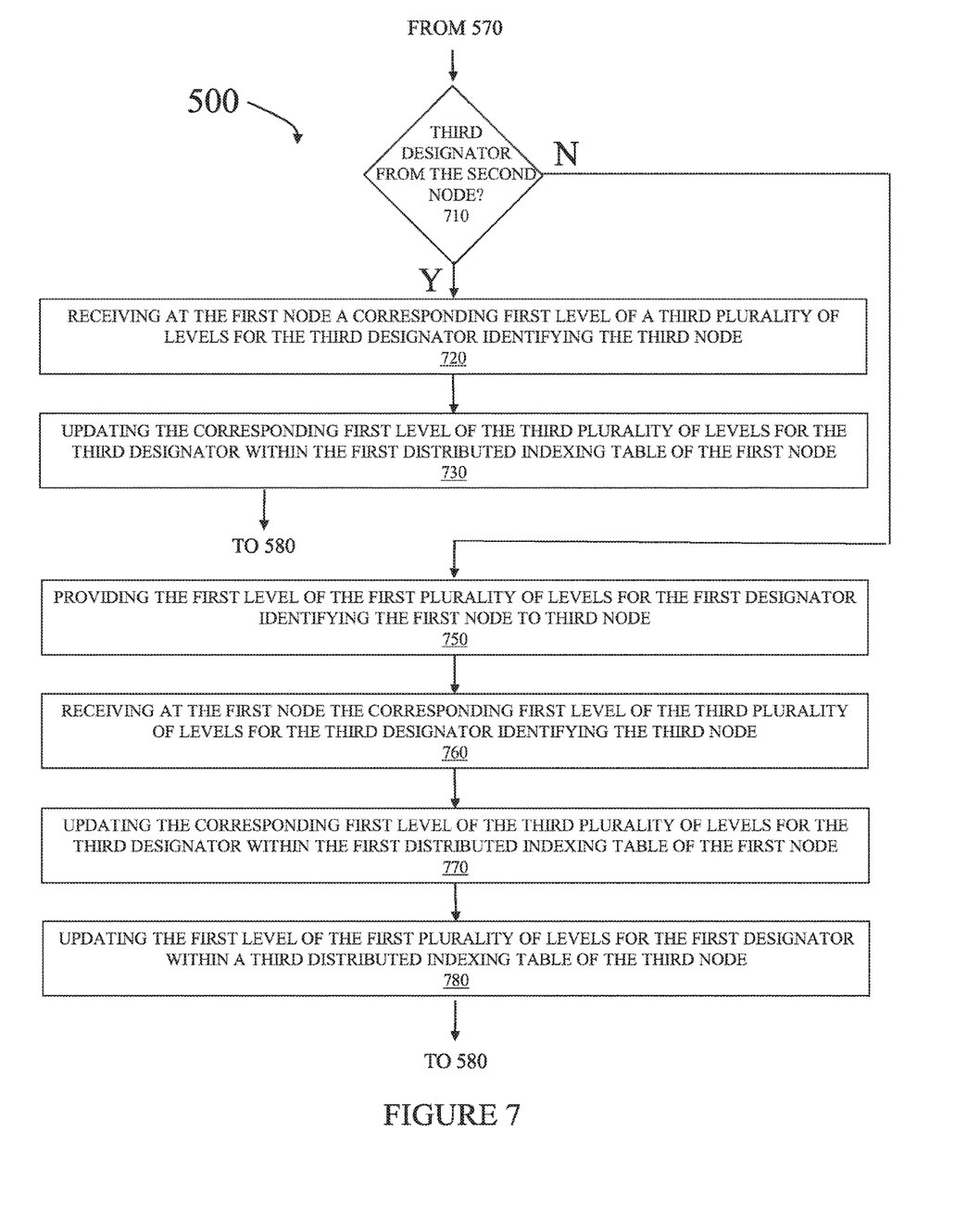

Turning now to FIGS. 5 to 7, illustrated are flow diagrams of an embodiment of a method 500 of operating a peer-to-peer network. The method 500 begins at a start step or module 510. A first node of the peer-to-peer network provides a first level of a first plurality of levels for a first designator identifying the first node and entered in a first distributed indexing table stored in the first node to a second node of the peer-to-peer network at a step or module 520. The first node receives, from the second node, a corresponding first level of a second plurality of levels for a second designator identifying the second node and entered in a second distributed indexing table stored in the second node at a step or module 530.

At a step or module 540, the first node updates the corresponding first level of the second plurality of levels for the second designator within the first distributed indexing table of the first node. At a step or module 550, the second node updates the first level of the first plurality of levels for the first designator within the second distributed indexing table of the second node. As a result, the first level of the plurality of levels for the first and second designators within the first and second distributed indexing tables for the first and second nodes, respectively, are now up-to-date. Of course, this process of updating the distributing indexing tables for nodes of the peer-to-peer network can be extended to multiple levels of the plurality of levels for the corresponding designators, and to multiple nodes in the peer-to-peer network.

Accordingly, the peer-to-peer network (via, for instance, a peer node(s) and/or a server resident in the core network) determines if there is a second level associated with the first and second designators for the first and second nodes, respectively, at a decisional step or module 560. If there is a second level, the first node provides a second level of the first plurality of levels for the first designator identifying the first node and entered in the first distributed indexing table stored in the first node to the second node at a step or module 610. The first node receives, from the second node, a corresponding second level of the second plurality of levels for the second designator identifying the second node and entered in the second distributed indexing table stored in the second node at a step or module 620.

At a step or module 630, the first node updates the corresponding second level of the second plurality of levels for the second designator within the first distributed indexing table of the first node. At a step or module 640, the second node updates the second level of the first plurality of levels for the first designator within the second distributed indexing table of the second node. As a result, the second level of the plurality of levels for the first and second designators within the first and second distributed indexing tables for the first and second nodes, respectively, are now up-to-date. Again, this process can be repeated for other levels for the first and second designators for the first and second nodes, respectively. Also, the process can update multiple levels for the first and second designators for the first and second nodes, respectively, at the same time. The method 500 thereafter transitions to decisional step or module 570.

Following the step or module 640 or if there is not a second level associated with the first and second designators for the first and second nodes, respectively (see decisional step or module 560), the peer-to-peer network (via, for instance, a peer node(s) and/or a server resident in the core network) determines if there is a third node therein at a decisional step or module 570. If there is a third node, the peer-to-peer network (via, for instance, a peer node(s) and/or a server resident in the core network) determines if a third designator identifying the third node will be provided by the second node at a decisional step or module 710.

If the second node provides the third designator, the first node receives, from the second node, a corresponding first level of a third plurality of levels for the third designator identifying the third node and entered in the second distributed indexing table stored in the second node at a step or module 720. At a step or module 730, the first node updates the corresponding first level of the third plurality of levels for the third designator within the first distributed indexing table of the first node. As a result, the first level of the third plurality of levels for the third designator is up-to-date within the first distributed indexing table. Again, this process can be repeated for other levels for the third designator for the third node, and the second node can also provide the first and second plurality of levels for the first and second designators for the first and second nodes, respectively, to the third node to update a third distributed indexing table therein. The method 500 thereafter transitions to a decisional step or module 580.

If the second node does not provide the third designator, another node such as the third node itself can provide the third designator within the peer-to-peer network. While the third node provides the third designator for the purpose of this illustration, it should be understood that another node including even a non-peer node such as a server in the core network can provide the third designator within the peer-to-peer network. Of course, this principle can apply to other peer nodes in the peer-to-peer network as well.

Assuming that the third designator is being provided by the third node, the first node provides the first level of the first plurality of levels for the first designator identifying the first node and entered in the first distributed indexing table stored in the first node to the third node at a step or module 750. The first node receives, from the third node, the corresponding first level of the third plurality of levels for the third designator identifying the third node and entered in the third distributed indexing table stored in the third node at a step or module 760.

At a step or module 770, the first node updates the corresponding first level of the third plurality of levels for the third designator within the first distributed indexing table of the first node. At a step or module 780, the third node updates the first level of the first plurality of levels for the first designator within the third distributed indexing table of the third node. As a result, the first level of the plurality of levels for the first and third designators within the first and third distributed indexing tables for the first and third nodes, respectively, are now up-to-date. Again, this process can be repeated for other levels for the first and third designators for the first and third nodes, respectively. Additionally, the first and third nodes can share designators for other peer nodes such as the second node within the peer-to-peer network. The method 500 thereafter transitions to the decisional step or module 580.

At the decisional step or module 580, the peer-to-peer network (via, for instance, a peer node(s) and/or a server resident in the core network) determines if the second node is departing the peer-to-peer network. If the second node is departing the peer-to-peer network, the first node deletes the second designator from the first distributed indexing table at a step or module 585. Other peer nodes in the peer-to-peer network can also remove the second designator identifying the second node from their corresponding distributed indexing tables as well. Also, the second designator can be removed from the first distributed indexing table (or other distributed indexing tables) for other purposes as well. The method 500 thereafter concludes at an end step or module 595.

If the second node remains in the peer-to-peer network, the peer-to-peer network (via, for instance, a peer node(s) and/or a server resident in the core network) determines if the method 500 should be repeated (e.g., periodically) at a decisional step or module 590. If the peer-to-peer network determines that the method 500 should be repeated, the method 500 returns to the step or module 520, otherwise the method 500 concludes at the end step or module 595. Even though the method 500 concluded following the step or module 585 for this illustration, the method 500 may be repeated thereafter as well to obtain designators for other peer nodes in the peer-to-peer network. It should be noted that the aforementioned method 500 covers the process from a single actor (e.g., the first node) or multiple actors (e.g., the first and second nodes).

The designators as set forth herein may be organized in a hierarchal structure to identify the corresponding plurality of levels associated therewith, and may represent fully qualified domain names. The designators may include terms separated by connectors such as dot-separated terms to identify the corresponding plurality of levels. The designators may represent a geographical location for the corresponding peer nodes. The distributed indexing tables may include a time stamp and history associated with the plurality of levels (or one thereof) for the corresponding designator. As an example, the first level of the first plurality of levels for the first designator may be earlier in time than the corresponding first level of the second plurality of levels for the second designator as designated by the time stamps.

Peer nodes (e.g., a first node 110) have been introduced herein that perform distributed indexing with other peer nodes (e.g., a second node 120) in a peer-to-peer network (100). In one embodiment (and including the reference numbers from FIGS. 1 and 2), the first node (110, including processing circuitry 210) is configured to provide to the second node (120) a first level of a first plurality of levels for a first designator identifying the first node (110) and entered in a first distributed indexing table stored in the first node (110). The first node (110) is configured to receive from the second node (120) a corresponding first level of a second plurality of levels for a second designator identifying the second node (120) and entered in a second distributed indexing table stored in the second node (120), and update the corresponding first level of the second plurality of levels for the second designator within the first distributed indexing table of the first node (110). The first node (110) may periodically repeat the aforementioned process or any actions set forth herein.

Assuming that there is a second level of the plurality of levels for the first and second designators for the first and second nodes, respectively, the first node (110) is configured to provide a second level of the first plurality of levels for the first designator and entered in the first distributed indexing table to said second node (120). The first node (110) is configured to receive a corresponding second level of the second plurality of levels for the second designator and entered in the second distributed indexing table from the second node (120), and update the corresponding second level of the second plurality of levels for the second designator within the first distributed indexing table of the first node (110).

Assuming that there is a third node (130) of the peer-to-peer network (100) and information thereabout is provided by the second node (120), the first node (110) is configured to receive a corresponding first level of a third plurality of levels for a third designator identifying the third node (130) and entered in the second distributed indexing table from the second node (120). The first node (110) is configured to update the corresponding first level of the third plurality of levels for the third designator within the first distributed indexing table of the first node (110).

Assuming that there is a third node (130) of the peer-to-peer network (100) and information thereabout is provided by another node (e.g., the third node (130), the first node (110) is configured to provide the first level of the first plurality of levels for the first designator and entered in the first distributed indexing table to the third node (130). The first node (110) is configured to receive a corresponding first level of a third plurality of levels for a third designator identifying the third node (130) and entered in a third distributed indexing table from the third node (130), and update the corresponding first level of the third plurality of levels for the third designator within the first distributed indexing table of the first node (110).

Assuming that the second node (120) is departing the peer-to-peer network (100), the first node is configured to delete the second designator from the first distributed indexing table. Of course, the first node (100) can delete the second designator from the first distributed indexing table for other reasons as well. The first designator and first distributed indexing table may consist of the characteristics as set forth above. Also, for purposes of clarity, when addressing the second node (120), the use of the terms a second designator having a second plurality of levels within a second distributed indexing table is referring to a designator having a plurality of levels within a distributed indexing table for the second node (120). Of course, the same principle applies to the other peer nodes in the peer-to-peer network. Additionally, the aforementioned statement does not preclude a peer node from having, for instance, multiple distributed indexing tables.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method operable in a peer-to-peer network for building distributed index tables for locating nodes in the peer-to-peer network, the method comprising:
   providing, from a first node to a second node of the peer-to-peer network, a first level of a first plurality of levels for a first designator identifying the first node, the first level of the first plurality of levels for the first designator being in a first distributed indexing table for locating nodes in the peer-to-peer network stored in the first node;
   receiving, at the first node from the second node, a corresponding first level of a second plurality of levels for a second designator identifying the second node, the first level of the second plurality of levels for the second designator being in a second distributed indexing table for locating nodes in the peer-to-peer network stored in the second node; and
   updating the corresponding first level of the second plurality of levels for the second designator within the first distributed indexing table of the first node and updating the first level of the first plurality of levels for the first designator within the second distributed indexing table of the second node;
   the first designator and the second designator being organized in a hierarchal structure to identify the first plurality of levels and the second plurality of levels, respectively; and
   the providing, the receiving and the updating being repeated periodically.

2. The method as recited in claim 1, further comprising:
   receiving, at the first node, a corresponding first level of a third plurality of levels for a third designator identifying a third node of the peer-to-peer network, the first level of the third plurality of levels for the first designator being in the second distributed indexing table, from the second node; and
   updating the corresponding first level of the third plurality of levels for the third designator within the first distributed indexing table of the first node.

3. The method as recited in claim 1, further comprising deleting the second designator from the first distributed indexing table.

4. The method as recited in claim 1, further comprising deleting the second designator from the first distributed indexing table when the second node departs the peer-to-peer network.

5. The method as recited in claim 1, wherein the first designator and the second designator represent fully qualified domain names.

6. The method as recited in claim 1, wherein the first designator and the second designator comprise terms separated by connectors to identify the first plurality of levels and the second plurality of levels, respectively.

7. The method as recited in claim 1, wherein the first designator and the second designator comprise dot-separated terms to identify the first plurality of levels and the second plurality of levels, respectively.

8. The method as recited in claim 1, wherein the first plurality of levels and the second plurality of levels represent a geographical location of the first node and the second node, respectively.

9. The method as recited in claim 1, wherein the first distributed indexing table comprises a time stamp and history associated with the first level of the first plurality of levels for the first designator and the corresponding first level of the second plurality of levels for the second designator.

10. The method as recited in claim 1, wherein the first level of the first plurality of levels for the first designator is earlier in time than the corresponding first level of the second plurality of levels for the second designator.

11. The method as recited in claim 1, further comprising:
providing, from the first node, a second level of the first plurality of levels for the first designator, the second level of the first plurality of levels for the first designator being in the first distributed indexing table, to the second node;
receiving, at the first node, a corresponding second level of the second plurality of levels for the second designator, the second level of the second plurality of levels for the first designator being in the second distributed indexing table, from the second node; and
updating the corresponding second level of the second plurality of levels for the second designator within the first distributed indexing table of the first node.

12. The method as recited in claim 11, further comprising updating the second level of the first plurality of levels for the first designator within the second distributed indexing table of the second node.

13. The method as recited in claim 1, further comprising:
providing, from the first node, the first level of the first plurality of levels for the first designator, the first level of the first plurality of levels for the first designator being in the first distributed indexing table, to a third node of the peer-to-peer network;
receiving, at the first node, a corresponding first level of a third plurality of levels for a third designator identifying the third node, the first level of the first plurality of levels for the third designator being in a third distributed indexing table, from the third node; and
updating the corresponding first level of the third plurality of levels for the third designator within the first distributed indexing table of the first node.

14. The method as recited in claim 13, further comprising updating the first level of the first plurality of levels for the first designator within the third distributed indexing table of the third node.

15. A first node operable in a peer-to-peer network for building distributed index tables, the first node comprising:
processing circuitry configured to:
provide to a second node of the peer-to-peer network a first level of a first plurality of levels for a first designator identifying the first node, the first level of the first plurality of levels for the first designator being in a first distributed indexing table for locating nodes in the peer-to-peer network stored in the first node;
receive from the second node a corresponding first level of a second plurality of levels for a second designator identifying the second node, the first level of the second plurality of levels for the second designator being in a second distributed indexing table for locating nodes in the peer-to-peer network stored in the second node; and
update the corresponding first level of the second plurality of levels for the second designator within the first distributed indexing table of the first node and update the first level of the first plurality of levels for the first designator within the second distributed indexing table of the second node;
the first designator and the second designator being organized in a hierarchal structure to identify the first plurality of levels and the second plurality of levels, respectively; and
the providing, the receiving and the updating being repeated periodically.

16. The first node as recited in claim 15, wherein the processing circuitry is configured to periodically provide to a second node the first level of the first plurality of levels for the first designator, receive from the second node the corresponding first level of the second plurality of levels for the second designator and update the corresponding first level of the second plurality of levels for the second designator within the first distributed indexing table.

17. The first node as recited in claim 15, wherein the processing circuitry is configured to:
provide a second level of the first plurality of levels for the first designator, the second level of the first plurality of levels for the first designator being in the first distributed indexing table to the second node;
receive a corresponding second level of the second plurality of levels for the second designator, the second level of the second plurality of levels for the second designator being in the second distributed indexing table from the second node; and
update the corresponding second level of the second plurality of levels for the second designator within the first distributed indexing table of the first node.

* * * * *